United States Patent
Dharmaraj

(10) Patent No.: US 10,207,828 B1
(45) Date of Patent: Feb. 19, 2019

(54) ATTACHMENT ASSEMBLY BETWEEN A ROTATING STRUCTURE AND A STATIONARY STRUCTURE FOR A HABITATION MODULE

(71) Applicant: The Boeing Company, Chicago, IL (US)

(72) Inventor: Raju Dharmaraj, League City, TX (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/940,935

(22) Filed: Mar. 29, 2018

(51) Int. Cl.
*B64G 1/60* (2006.01)
*B64G 1/64* (2006.01)
*F16J 15/00* (2006.01)
*B64G 1/12* (2006.01)
*B64G 1/46* (2006.01)

(52) U.S. Cl.
CPC ............... *B64G 1/60* (2013.01); *B64G 1/64* (2013.01); *B64G 1/12* (2013.01); *B64G 1/46* (2013.01); *F16J 15/008* (2013.01)

(58) Field of Classification Search
CPC ... B64G 1/12; B64G 1/46; B64G 1/60; B64G 1/64
See application file for complete search history.

(56) References Cited

U.S. PATENT DOCUMENTS

| 3,144,219 A | 8/1964 | Emanuel | |
|---|---|---|---|
| 3,210,026 A * | 10/1965 | Frisch | B64G 1/12 244/159.4 |
| 3,744,739 A * | 7/1973 | Weaver | B64G 1/12 244/172.4 |
| 3,864,771 A * | 2/1975 | Bauer | B63B 22/22 220/8 |
| 4,643,375 A | 2/1987 | Allen | |
| 6,216,984 B1 | 4/2001 | Brinsmade | |

(Continued)

FOREIGN PATENT DOCUMENTS

WO    1987000142 A1    1/1987

OTHER PUBLICATIONS

Chung, Winchell. "Artificial Gravity." Retrieved from Internet Archive Wayback Machine as the website appeared on Jan. 9, 2016. URL for Internet Archive retrieval: <https://web.archive.org/web/20160109081205/http://www.projectrho.com/public_html/rocket/artificialgrav.php> (Year: 2016).*

*Primary Examiner* — Philip J Bonzell
*Assistant Examiner* — Michael B. Kreiner
(74) *Attorney, Agent, or Firm* — Duft & Bornsen, PC

(57) ABSTRACT

A habitation module that provides an artificial gravity environment. In one embodiment, the habitation module includes a rotating structure configured to rotate about an axis in relation to a stationary structure, and attachment assemblies configured to rotatably couple the rotating structure to the stationary structure. The attachment assemblies comprise bearings installed coaxially between a cylindrical housing of the rotating structure and a cylindrical body member of the stationary structure, and dynamic radial seals installed coaxially between the cylindrical housing and the cylindrical body member. The attachment assemblies further comprise a static seal assembly that includes an end cap movable between a locked position and an unlocked position.

20 Claims, 14 Drawing Sheets

(56) References Cited

U.S. PATENT DOCUMENTS

| | | |
|---|---|---|
| 6,523,782 B2 | 2/2003 | Barutt |
| 6,547,189 B1 | 4/2003 | Raboin et al. |
| 9,090,361 B2 | 7/2015 | Clay |
| 9,359,091 B2 | 6/2016 | Biddlecom |
| 9,758,263 B2 * | 9/2017 | Clay ................. B64G 1/14 |
| 9,776,743 B2 | 10/2017 | Dharmaraj et al. |
| 9,908,644 B2 * | 3/2018 | Dharmaraj ............. B64G 1/60 |
| 9,994,338 B2 * | 6/2018 | Dharmaraj ............. B64G 1/46 |
| 10,059,469 B2 * | 8/2018 | Dharmaraj ............. B64G 1/12 |
| 10,077,121 B2 * | 9/2018 | Dharmaraj ............. B64G 1/60 |
| 2002/0074457 A1 | 6/2002 | Barutt |
| 2014/0124626 A1 | 5/2014 | Clay |
| 2014/0124627 A1 | 5/2014 | Clay |
| 2017/0197734 A1 | 7/2017 | Dharmaraj et al. |
| 2017/0197735 A1 | 7/2017 | Dharmaraj et al. |
| 2017/0197736 A1 | 7/2017 | Dharmaraj et al. |
| 2017/0197737 A1 * | 7/2017 | Dharmaraj ............. B64G 1/60 |
| 2017/0197738 A1 | 7/2017 | Dharmaraj et al. |
| 2017/0240302 A1 | 8/2017 | Dharmaraj |
| 2017/0240303 A1 | 8/2017 | Dharmaraj |
| 2017/0361950 A1 * | 12/2017 | Dharmaraj ............. B64G 1/46 |

* cited by examiner

ATTACHMENT ASSEMBLY BETWEEN A ROTATING STRUCTURE AND A STATIONARY STRUCTURE FOR A HABITATION MODULE

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes a stationary structure, and a rotating structure that includes one or more gravity chambers. The rotating structure is driven to rotate about an axis in relation to the stationary structure to create artificial gravity within the gravity chambers. Attachment assemblies rotatably couple the rotating structure to the stationary structure using bearings. Attachment assemblies also include dynamic radial seals that provide a hermetic seal between the rotating structure and the stationary structure so that the interior of the habitation module may be pressurized. Attachment assemblies also include a static seal assembly that is configured to form a closeout seal between the rotating structure and the stationary structure in case of a failure in the dynamic radial seals. The implementation of the static seal assemblies advantageously allows the habitation module to remain in use and provide a pressurized environment even if a failure occurs in one or more of the dynamic radial seals.

One embodiment comprises an attachment assembly of a habitation module configured to attach a rotating structure to a stationary structure. The stationary structure has a cylindrical body member, and the rotating structure has a cylindrical housing that slides over the cylindrical body member. The attachment assembly comprises bearings installed coaxially between the cylindrical housing and the cylindrical body member, and dynamic radial seals installed coaxially between the cylindrical housing and the cylindrical body member. The attachment assembly also comprises a static seal assembly having an end cap attached to an interior end of the cylindrical body member. The end cap is configured to physically link the rotating structure to the stationary structure to prevent rotation of the rotating structure, and to seal around the interior end of the cylindrical body member and around an interior end of the cylindrical housing to prevent escape of air from an interior of the habitation module.

In another embodiment, the end cap is configured to move axially away from the interior end of the cylindrical body member and the interior end of the cylindrical housing, and disengage from the cylindrical housing to allow for rotation of the rotating structure.

In another embodiment, the static seal assembly further includes a first annular face seal, a second annular face seal having a larger diameter than the first annular face seal, and fasteners configured to affix the end cap to the cylindrical body member and the cylindrical housing, to compress the first annular face seal between the end cap and the interior end of the cylindrical body member, and to compress the second annular face seal between the end cap and the interior end of the cylindrical housing.

In another embodiment, the fasteners comprise inner fasteners configured to fasten the end cap to the cylindrical body member, and outer fasteners configured to fasten the end cap to the cylindrical housing.

In another embodiment, the inner fasteners include stop washers that limit an amount that the inner fasteners are loosened.

In another embodiment, the static seal assembly further includes a first annular dust seal that extends between the end cap and the interior end of the cylindrical body member when the end cap is moved axially, and a second annular dust seal that extends between the end cap and the interior end of the cylindrical housing when the end cap is moved axially.

In another embodiment, the static seal assembly further includes a helical spring between the end cap and the interior end of the cylindrical body member that is configured to apply a force to move the end cap axially away from the cylindrical body member.

Another embodiment comprises a habitation module comprising a rotating structure configured to rotate about an axis in relation to a stationary structure to create artificial gravity within at least one gravity chamber of the rotating structure. The habitation module further comprises attachment assemblies configured to rotatably couple the rotating structure to the stationary structure. The attachment assemblies each comprise bearings installed coaxially between a cylindrical housing of the rotating structure and a cylindrical body member of the stationary structure, dynamic radial seals installed coaxially between the cylindrical housing and the cylindrical body member, and a static seal assembly that includes an end cap movable between a locked position and an unlocked position. In the locked position, the end cap is configured to contact an interior end of the cylindrical body member and an interior end of the cylindrical housing to prevent escape of air from an interior of the habitation module. In the unlocked position, the end cap is configured to disengage from the interior end of the cylindrical housing.

In another embodiment, in the locked position, the end cap is configured to fasten to the cylindrical body member and the cylindrical housing to prevent rotation of the rotating structure.

In another embodiment, the static seal assembly further includes a first annular face seal, a second annular face seal having a larger diameter than the first annular face seal, inner fasteners configured to fasten the end cap to the cylindrical body member, and outer fasteners configured to fasten the end cap to the cylindrical housing.

In another embodiment, in the locked position, the inner fasteners are configured to fasten the end cap to the cylindrical body member with the first annular face seal compressed between the end cap and the interior end of the cylindrical body member, and the outer fasteners are configured to fasten the end cap to the cylindrical housing with the second annular face seal compressed between the end cap and the interior end of the cylindrical housing.

In another embodiment, in the unlocked position, the outer fasteners are configured to disengage from the cylindrical housing, and the inner fasteners are configured to loosen to move the end cap axially away from the interior end of the cylindrical body member and the interior end of the cylindrical housing.

In another embodiment, the inner fasteners include stop washers that limit an amount that the inner fasteners are loosened.

In another embodiment, the static seal assembly further includes a first annular dust seal that extends between the end cap and the interior end of the cylindrical body member when the end cap is moved axially, and a second annular dust seal that extends between the end cap and the interior end of the cylindrical housing when the end cap is moved axially.

In another embodiment, the static seal assembly further includes a helical spring installed between the end cap and the interior end of the cylindrical body member, and configured to apply a force to move the end cap axially.

In another embodiment, the bearings comprise tapered roller bearings, and the attachment assemblies each further comprise a bearing shim and a bearing cap that sandwich the tapered roller bearings.

In another embodiment, the stationary structure includes cylindrical body members that are coaxial, and a splined sleeve that connects the cylindrical body members.

Another embodiment comprises a habitation module comprising a stationary structure including cylindrical body members that are spaced apart and aligned coaxially, and a rotating structure including cylindrical housings that are aligned coaxially. The cylindrical body members of the stationary structure fit within openings of the cylindrical housings. The habitation module further comprises an attachment assembly configured to attach a cylindrical body member of the stationary structure to a cylindrical housing of the rotating structure. The attachment assembly includes tapered roller bearings installed coaxially between the cylindrical body member and the cylindrical housing, dynamic radial seals installed coaxially between the cylindrical housing and the cylindrical body member to span a radial gap between the cylindrical body member and the cylindrical housing, and a static seal assembly. The static seal assembly comprises an end cap, first annular face seals, second annular face seals having a larger diameter than the first annular face seals, inner fasteners configured to fasten the end cap to the cylindrical body member with the first annular face seals compressed between the end cap and an interior end of the cylindrical body member, and outer fasteners configured to fasten the end cap to the cylindrical housing with the second annular face seals compressed between the end cap and an interior end of the cylindrical housing.

In another embodiment, the static seal assembly further comprises a helical spring installed between the end cap and the interior end of the cylindrical body member, and configured to apply a force to move the end cap axially away from the interior end of the cylindrical body member and the interior end of the cylindrical housing when the inner fasteners are loosened and the outer fasteners are disengaged from the cylindrical housing.

In another embodiment, the static seal assembly further comprise a first annular dust seal that extends between the end cap and the interior end of the cylindrical body member when the end cap is moved axially, and a second annular dust seal that extends between the end cap and the interior end of the cylindrical housing when the end cap is moved axially.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
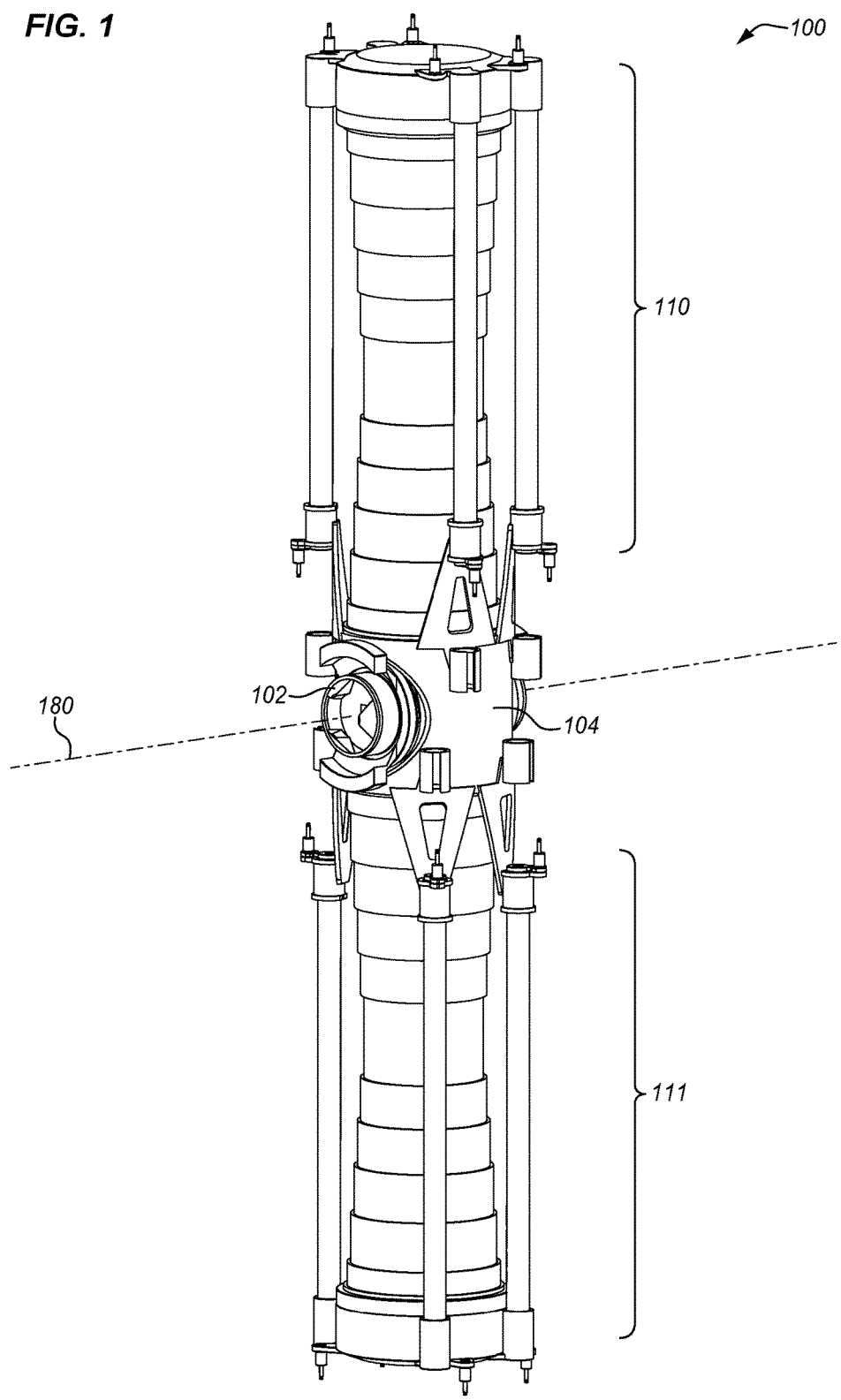
FIG. 1 illustrates a habitation module in an illustrative embodiment.

FIG. 1 illustrates a habitation module 100 in an illustrative embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 includes a stationary structure 102 and a rotating structure 104 configured to rotate in relation to stationary structure 102 about an axis 180. Each end of rotating structure 104 includes a gravity chamber 110-111. The interior of HAB 100 is substantially open to allow a crew member to enter a gravity chamber 110-111, or pass between gravity chambers 110-111. Also, the interior of HAB 100 is pressurized so that crew members do not have to wear specialized suits when in HAB 100. Gravity chambers 110-111 comprise the pods or compartments of HAB 100 where crew members may experience artificial gravity. Rotating structure 104 is driven to rotate at a speed about axis 180 to create an artificial gravity environment within gravity chambers 110-111. For example, rotating structure 104 may be driven at 5 rpm, 10 rpm, 12 rpm, etc., to generate simulated gravity, such as in the range of 0.2 G to 1 G. The speed of rotation is adjustable depending on the comfort of the crew members and the desired artificial gravity inside of gravity chambers 110-111. The interior of gravity chambers 110-111 may be hollow or empty to form open quarters for crew members. The interior of gravity chambers 110-111 may include a treadmill, an exercise bike, or any other exercise equipment. The interior of gravity chambers 110-111 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chambers 110-111 may also be compartmentalized into individual rooms.

Figure 2:
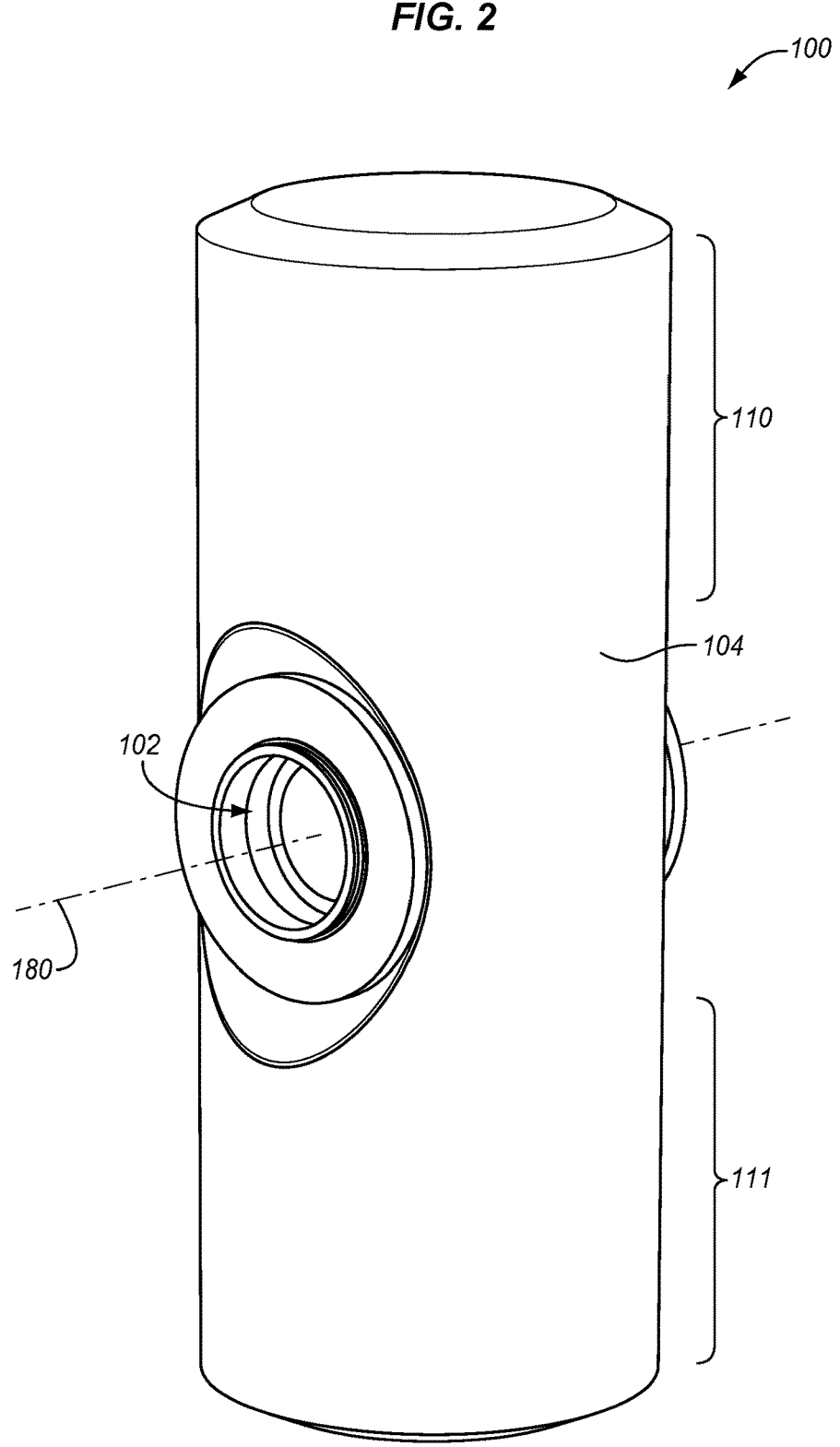
FIG. 2 illustrates a habitation module in another illustrative embodiment.
Figure 3:
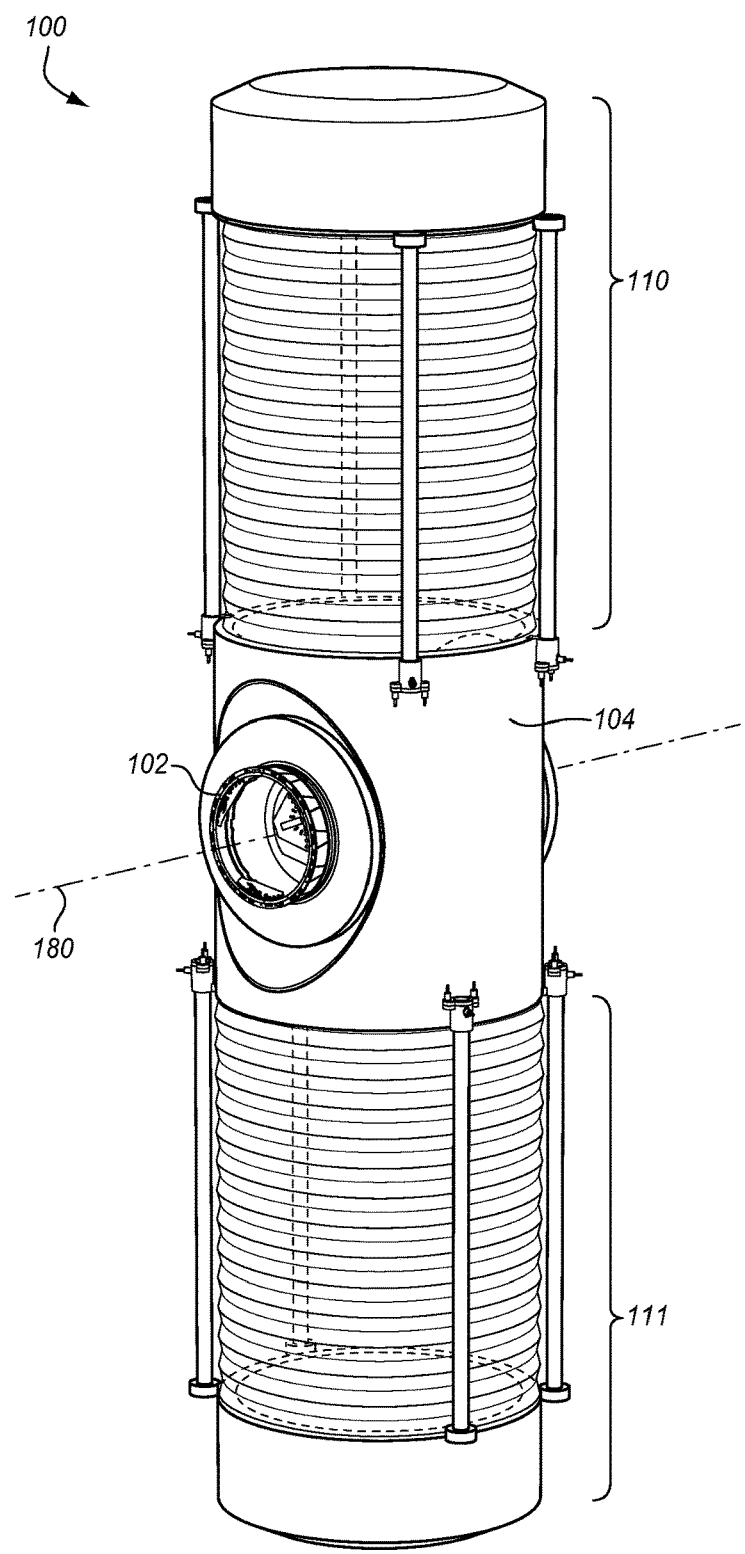
FIG. 3 illustrates a habitation module in another illustrative embodiment.

The gravity chambers 110-111 shown in FIG. 1 are extendable and retractable to allow for the rotational radius of rotating structure 104 to be changed when HAB 100 is put into service in space. However, the concepts described herein apply to other types of rotating structures 104 having different configurations for gravity chambers 110-111. FIGS. 2-3 illustrate other HABs 100 in illustrative embodiments. The HABs 100 shown in FIGS. 2-3 each include a stationary structure 102, and a rotating structure 104 that includes gravity chambers 110-111. Other types of HABs not specifically shown are considered herein that include a rotating structure that rotates about an axis in relation to a stationary structure as shown in FIGS. 1-3. Also, there may be more or less gravity chambers 110-111 than are shown in FIGS. 1-3.

Figure 4:
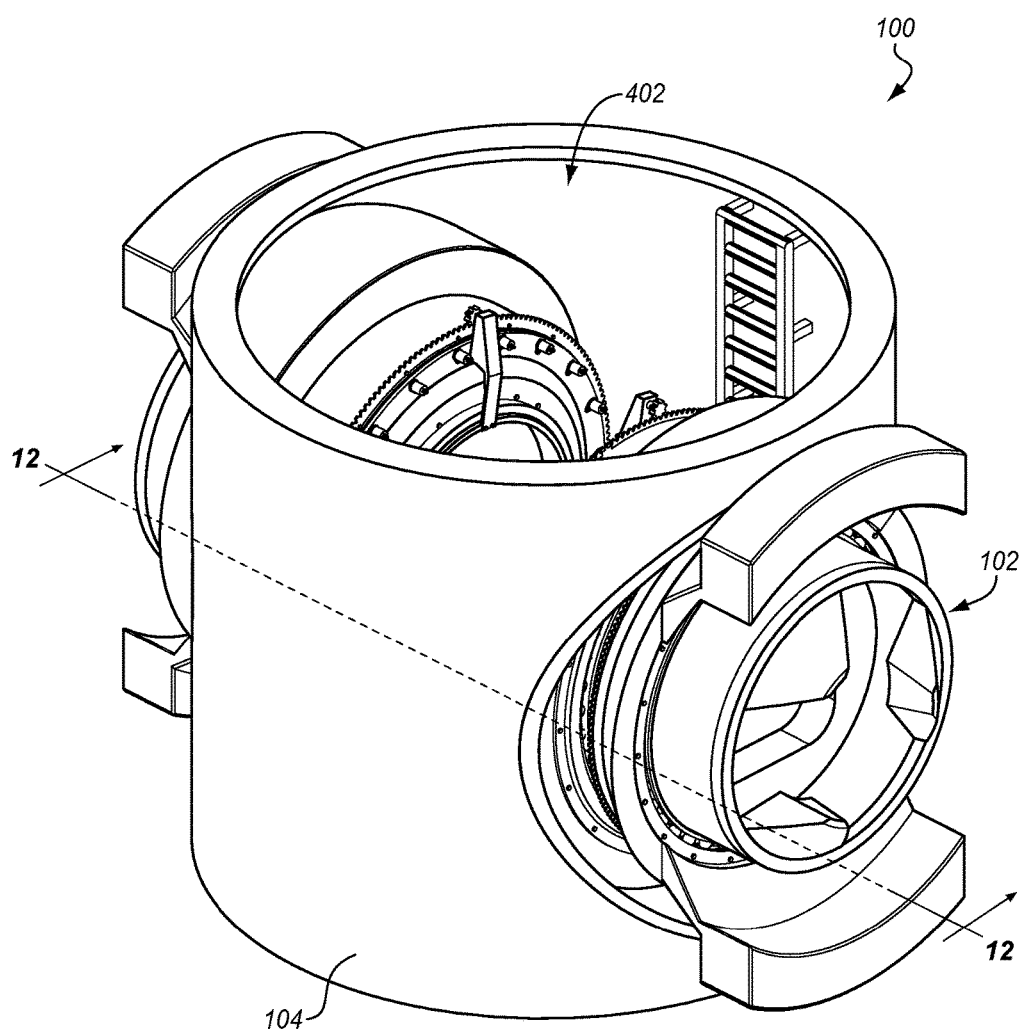
FIG. 4 is a perspective view of a section of a habitation module in an illustrative embodiment.

FIG. 4 is a perspective view of a section of HAB 100 in an illustrative embodiment. In this view, gravity chambers 110-111 of rotating structure 104 are removed so that the interior 402 of HAB 100 is visible. When in operation, the interior 402 of HAB 100 is pressurized and temperature-controlled so that crew members do not need to wear specialize suits. To maintain a pressurized environment within the interior 402 of HAB 100, the attachment points between rotating structure 104 and stationary structure 102 are hermetically sealed. As is described in more detail below, attachment assemblies are used to connect rotating structure 104 to stationary structure 102. The attachment assemblies include bearings that allow rotating structure 104 to rotate in relation to stationary structure 102. The attachment assemblies also include dynamic radial seals that provide a hermetic seal between rotating structure 104 and stationary structure 102. The attachment assemblies also include a static seal assembly that may be used to seal the interior 402 of HAB 100 from the outside environment in the event that one or more of the dynamic radial seals degrade or fail. The following further describes stationary structure 102, rotating structure 104, and the attachment assemblies of a HAB.

Figure 5:
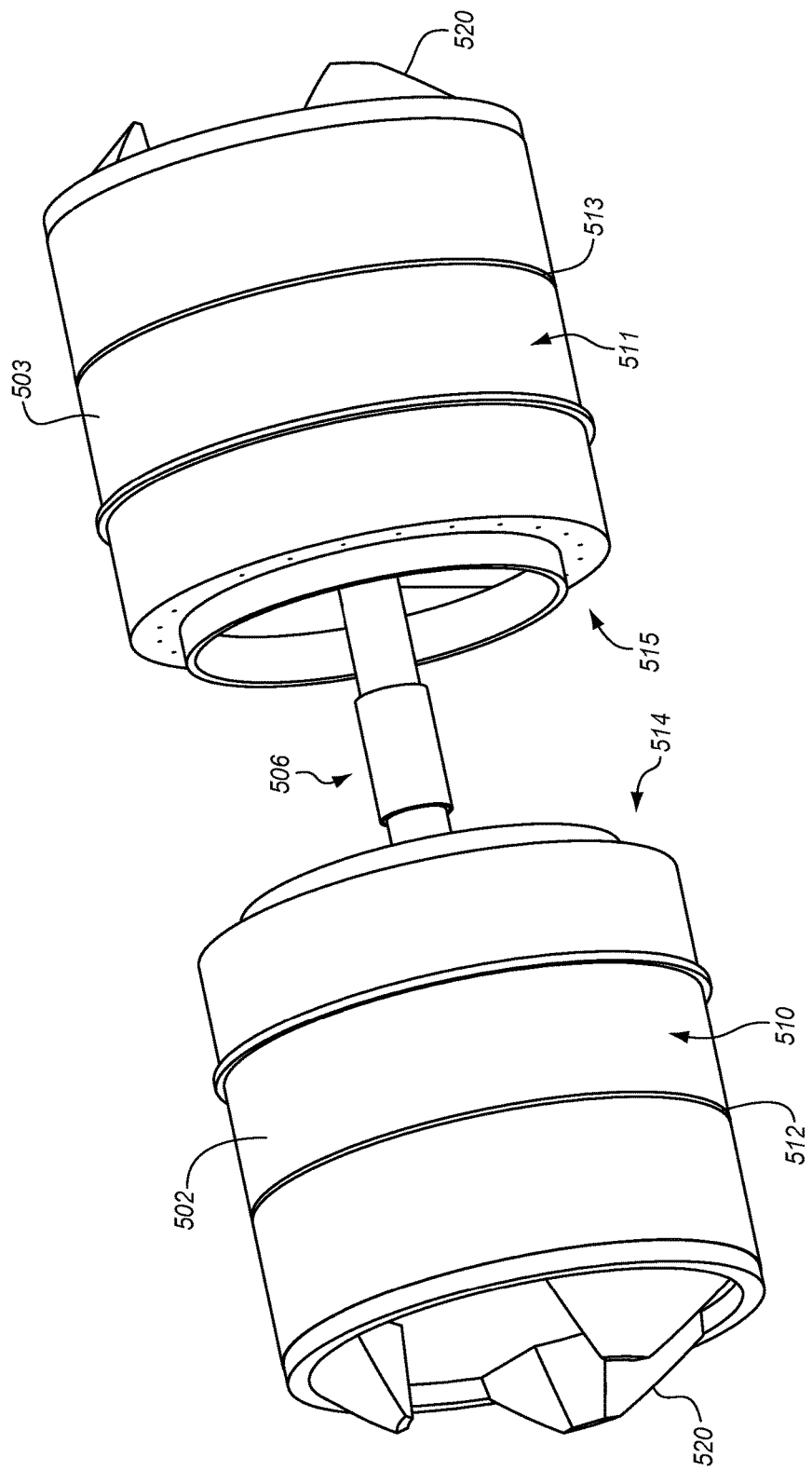
FIG. 5 is a perspective view of a stationary structure in an illustrative embodiment.
Figure 15:
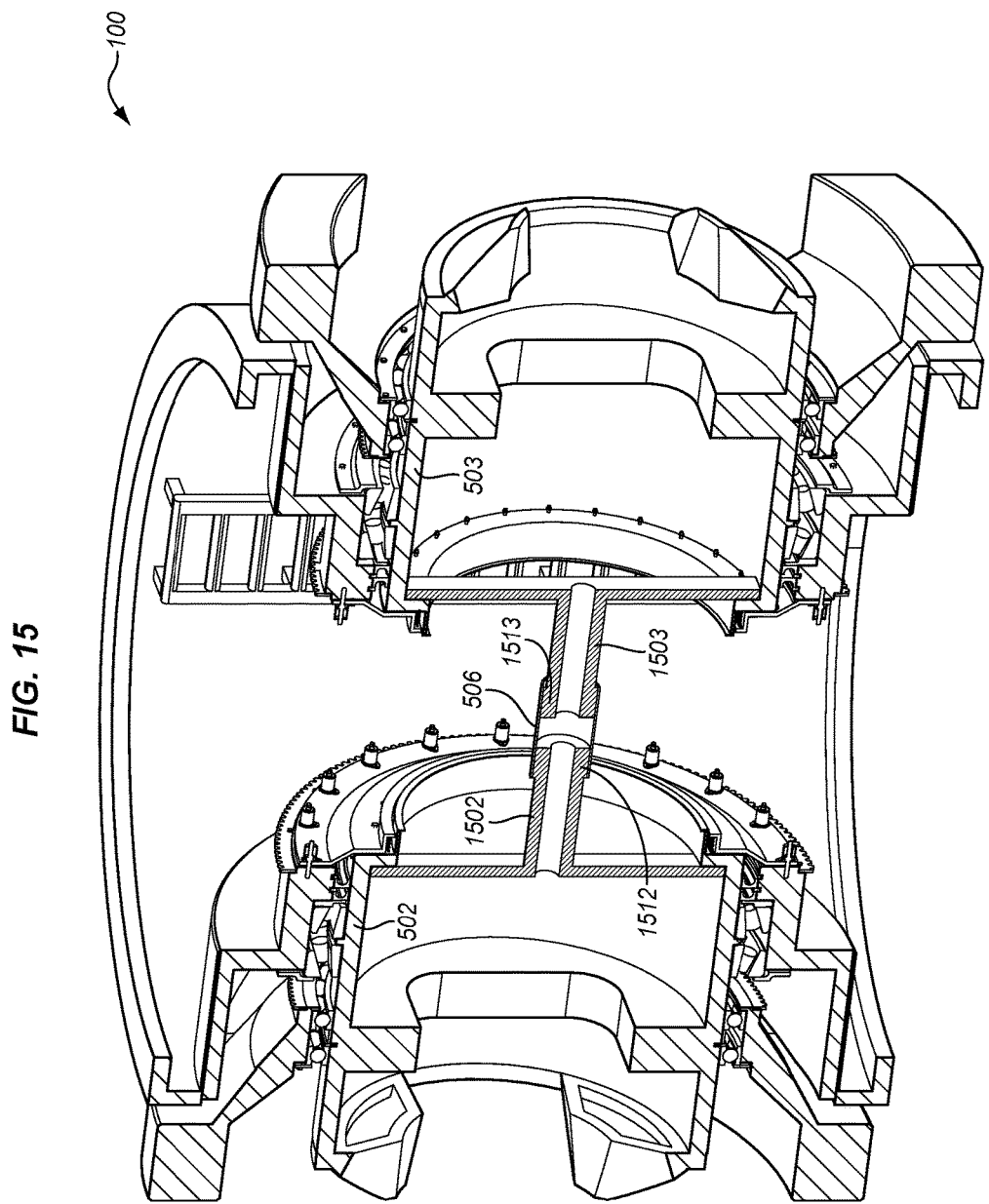
FIG. 15 is a cross-sectional view of a habitation module in an illustrative embodiment.

FIG. 5 is a perspective view of stationary structure 102 in an illustrative embodiment. Stationary structure 102 generally has a cylindrical profile along its length so that rotating structure 104 can slide onto stationary structure 102, and rotate around stationary structure 102. To create the cylindrical profile, stationary structure 102 includes body members 502-503 that are hollow, cylindrical members. Body members 502-503 are spaced apart and aligned coaxially with one another. In one embodiment, body members 502-503 are individual members that are not permanently affixed to one another. Body members 502-503 may be connected by a splined sleeve 506 as shown in FIGS. 5 and 15.

Body member 502 has an outer cylindrical surface 510, an exterior end 512, and an interior end 514. Likewise, body member 503 has an outer cylindrical surface 511, an exterior end 513, and an interior end 515. An interior end 514-515 of a body member 502-503 is an end that faces toward the interior 402 of HAB 100, and an exterior end 512-513 of a body member 502-503 is an end that faces away from the interior 402 of HAB 100. Outer cylindrical surfaces 510-511 of body members 502 are mounting surfaces for the attachment assemblies (i.e., the bearings and dynamic radial seals). A docking mechanism 520 may be attached to exterior ends 512-513 of body members 502-503. A docking mechanism 520 (or berthing mechanism) comprises an active or passive mechanism that forms an air-tight or pressure-tight seal between a stationary structure 102 and another module, such as a module of a space station.

Figure 6:
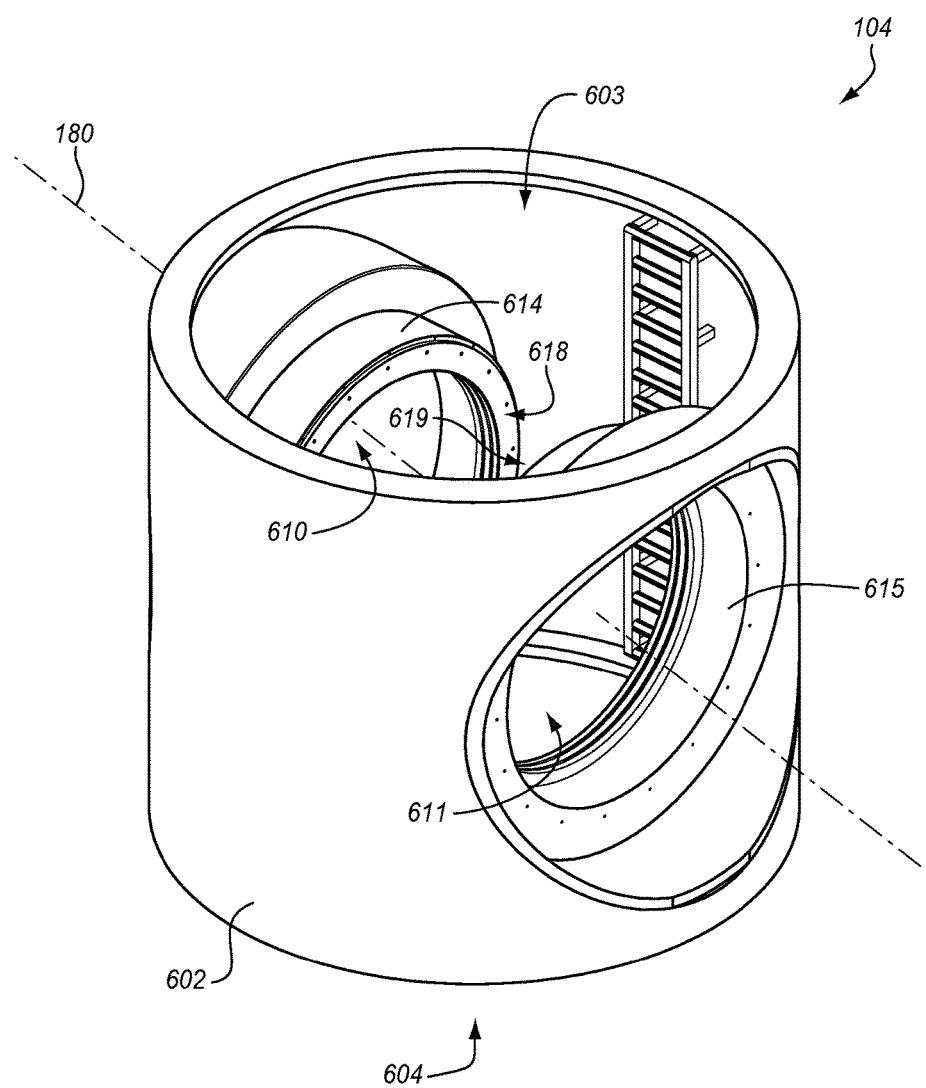
FIG. 6 is a perspective view of a rotating structure in an illustrative embodiment.

FIG. 6 is a perspective view of rotating structure 104 in an illustrative embodiment. FIG. 6 illustrates a segment of rotating structure 104 that rotatably couples or mounts to stationary structure 102. Rotating structure 104 comprises a cylindrical body that is substantially hollow and open at its ends 603-604, which is referred to as hub member 602. Ends 603-604 of hub member 602 are where gravity chambers 110-111 may project in opposite directions (see FIGS. 1-3). Hub member 602 includes cylindrical housings 614-615, which are the structural elements of rotating structure 104 that couple to the attachment assemblies (e.g., bearings and dynamic radial seals). Cylindrical housings 614-615 have openings 610-611, respectively, that are coaxially aligned to form a cylindrical aperture through the center of hub member 602. The inner diameter of cylindrical housings 614-615 are at least as large as the outer diameter of body members 502-503 of stationary structure 102 so that body members 502-503 are able to fit within openings 610-611 of the cylindrical housings 614-615.

Figure 7:
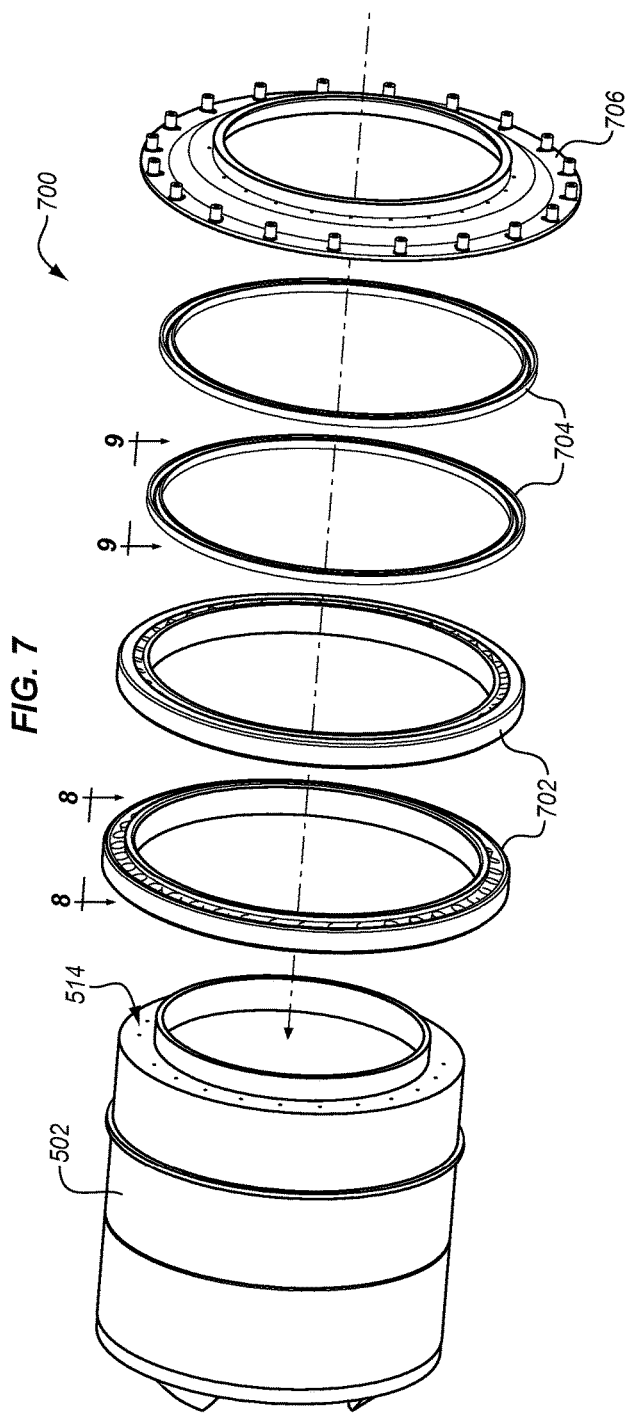
FIG. 7 is an exploded view of an attachment assembly in an illustrative embodiment.
Figure 8:
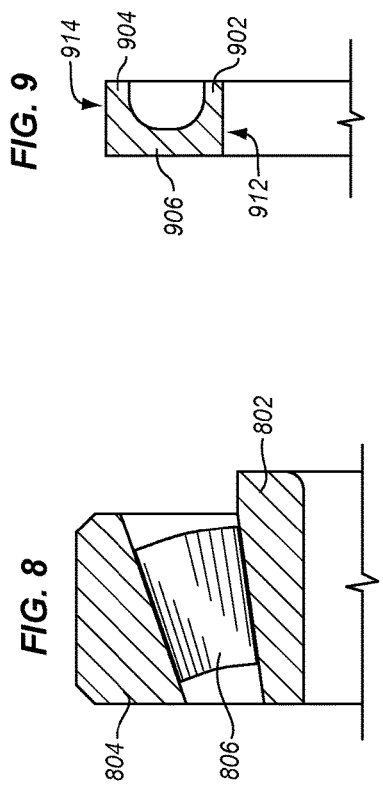
FIG. 8 is a cross-sectional view of a tapered roller bearing in an illustrative embodiment.

As described above, attachment assemblies are used to rotatably couple rotating structure 104 to stationary structure 102. FIG. 7 is an exploded view of an attachment assembly 700 in an illustrative embodiment. Attachment assembly 700 includes two (or more) tapered roller bearings 702 or another annular-shaped bearing, two (or more) radial seals 704, and a static seal assembly 706. A tapered roller bearing 702 is an annular-shaped bearing that supports axial forces and radial forces. FIG. 8 is a cross-sectional view of a tapered roller bearing 702 in an illustrative embodiment. The view is FIG. 8 is across view arrows 8-8 in FIG. 7. Tapered roller bearing 702 includes an inner race (or ring) 802, an outer race (or ring) 804, and rolling elements 806 between the inner race 802 and outer race 804 that enables rotational movement. Inner race 802 is configured to attach/mount to a body member 502-503 of stationary structure 102 (see FIG. 5), and outer race 804 is configured to attach/mount to a cylindrical housing 614-615 of rotating structure 104.

Figure 9:
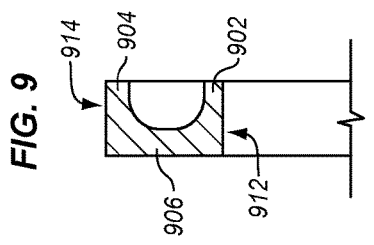
FIG. 9 is a cross-sectional view of a radial seal in an illustrative embodiment.

In FIG. 7, radial seals 704 are annular-shaped dynamic seals configured to seal a radial gap between rotating structure 104 and stationary structure 102. A dynamic seal is one where there is motion between a hardware component and the sealing element. Due to a diameter difference between a body member 502-503 and a cylindrical housing 614-615, there is a radial gap between the body member 502-503 and the cylindrical housing 614-615 to allow for rotation. This radial gap may expose the interior 402 of HAB 100 to the outside environment if not properly sealed. Radial seals 704 are configured to seal the radial gap between a body member 502-503 and a cylindrical housing 614-615 to allow for pressurization of HAB 100. FIG. 9 is a cross-sectional view of a radial seal 704 in an illustrative embodiment. The view is FIG. 9 is across view arrows 9-9 in FIG. 7. In this embodiment, radial seal 704 includes an inner lip member 902 and an outer lip member 904 connected by a back member 906. Inner lip member 902 has a lip, face, or contact surface 912 configured to contact a surface of a body member 502-503 of stationary structure 102. Outer lip member 904 has a lip, face, or contact surface 914 configured to contact a surface of a cylindrical housing 614-615. The structure of radial seal 704 shown in FIG. 9 is just one example, and radial seal 704 may have other structural configurations in other embodiments.

Figure 10:
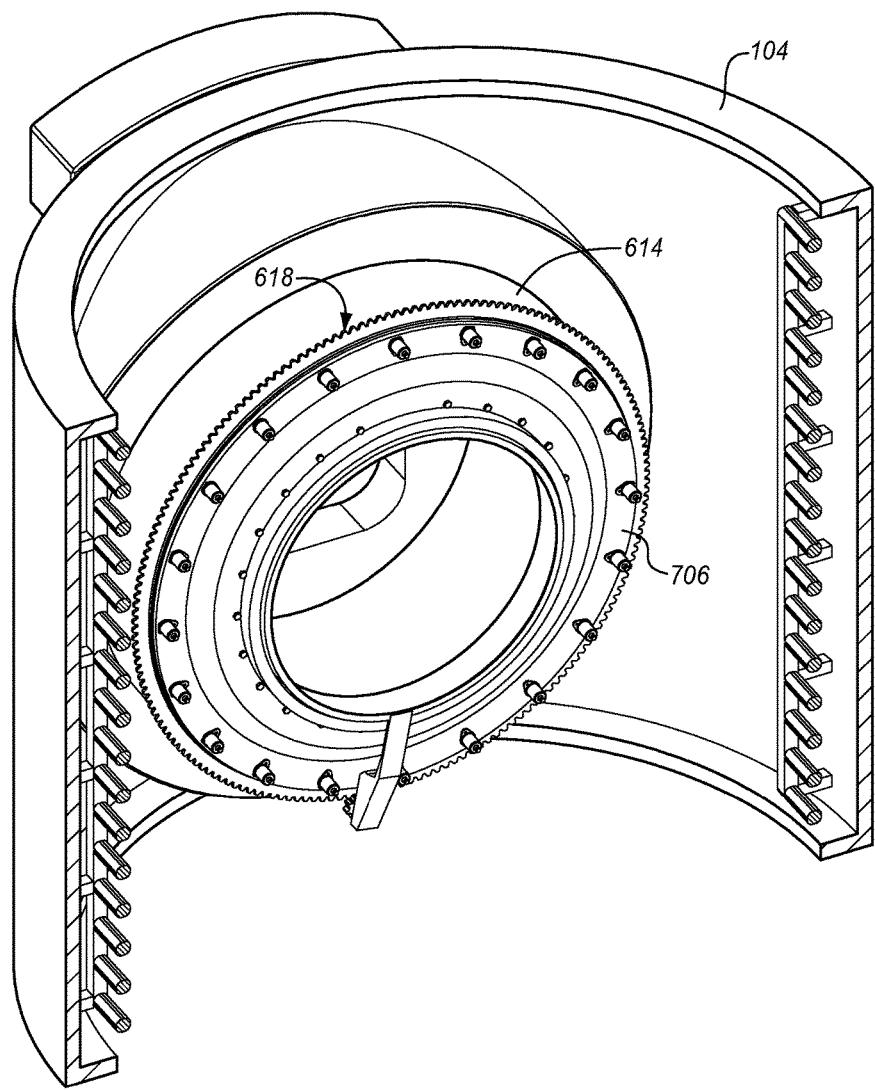
FIG. 10 is a perspective, cross-sectional view of a habitation module in an illustrative embodiment.

In FIG. 7, installation of tapered roller bearings 702 and radial seals 704 provides a reliable bearing and seal arrangement for constant rotation of rotating structure 104 for long periods of time and effective sealing with minimal air loss. However, after prolonged rotation of rotating structure 104, radial seals 704 may begin to degrade or fail resulting in loss of pressurization of HAB 100. Thus, attachment assembly 700 further includes a static seal assembly 706. Static seal assembly 706 is configured to provide a backup, shutdown, or closeout seal. Static seal assembly 706 is situated in the interior 402 of HAB 100 as shown in FIG. 10, and may be moved between a locked position and an unlocked position. When in the locked position, rotating structure 104 is stopped and static seal assembly 706 is secured to the interior end 514 of a body member 502 (see FIGS. 5 and 7) and the interior end 618 of a cylindrical housing 614 (see also, FIG. 6) to form a seal between stationary structure 102 and rotating structure 104. Static seal assembly 706 may be set in the locked position when HAB 100 is transported into space, when pressurization is compromised due to degradation or failure of a radial seal 704, etc. When in the unlocked position, static seal assembly 706 is disengaged from the interior end 618 of cylindrical housing 614 so that rotating structure 104 is free to rotate. Static seal assembly 706 may be set in the unlocked position during normal operation of HAB 100 where rotating structure 104 is rotating in relation to stationary structure 102 and radial seals 704 are providing a proper seal.

Figure 11:
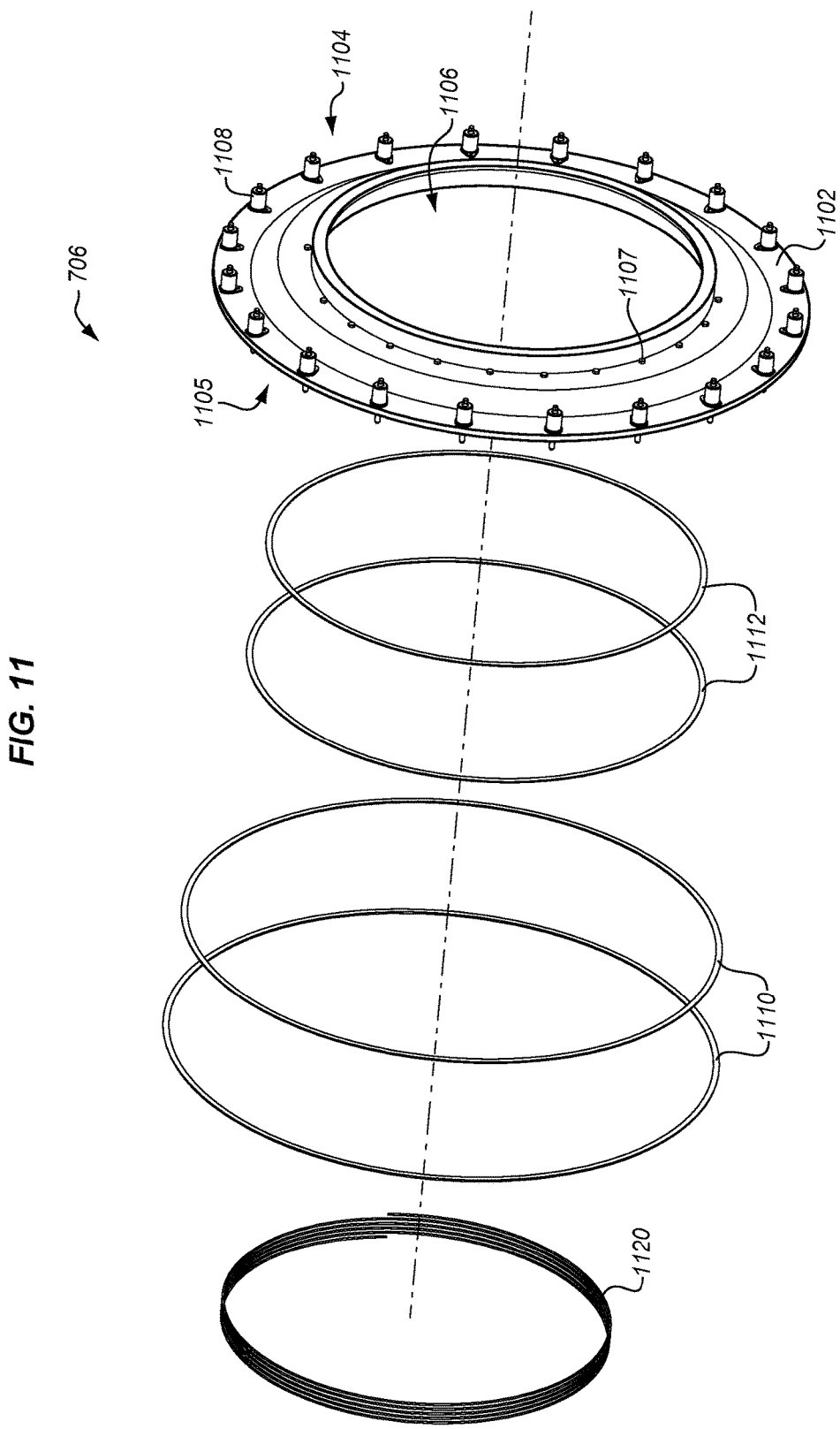
FIG. 11 is an exploded view of a static seal assembly in an illustrative embodiment.

FIG. 11 is an exploded view of static seal assembly 706 in an illustrative embodiment. Static seal assembly 706 includes an end cap 1102 having an interior face 1104 that faces toward the interior 402 of HAB 100, and an exterior face 1105 opposing the interior face 1104. End cap 1102 may be made from a rigid material, such as metal, a composite material, plastic, or another type of rigid material. End cap 1102 may have a circular shape as shown in FIG. 11, with an opening 1106 through its center. The outer diameter of end cap 1102 is at least as large as an outer diameter of an interior end 618-619 of a cylindrical housing 614-615 (see FIG. 6). The inner diameter of end cap 1102 (i.e., the outer diameter of opening 1106) is similar or smaller than an inner diameter of an interior end 514-515 of a body member 502-503 (see FIG. 5). Due to the size/shape of end cap 1102, it may be tightened against or contact an interior end 514-515 of a body member 502-503 and an interior end 618-619 of a cylindrical housing 614-615. End cap 1102 therefore seals around the interior end 514-515 of a body member 502-503 and the interior end 618-619 of a cylindrical housing 614-615 to prevent escape of air from interior 402 of HAB 100 through the radial gap.

Static seal assembly 706 further includes inner fasteners 1107 and outer fasteners 1108. A fastener comprises any device used to hold objects together, such as a bolt. Inner fasteners 1107 are accessible from the interior 402 of HAB 100 (intravehicular activities (IVA)), and are configured to fasten end cap 1102 to a body member 502-503 of stationary structure 102. Inner fasteners 1107 may be tightened to draw end cap 1102 firmly against an interior end 514-515 of a body member 502-503. Inner fasteners 1107 may include stop washers that limit the amount that inner fasteners 1107 may be loosened by a crew member. Outer fasteners 1108 are also accessible from the interior of HAB 100 (IVA), and are configured to fasten end cap 1102 to a cylindrical housing 614-615 of rotating structure 104. Outer fasteners 1108 may be tightened to draw end cap 1102 firmly against an interior end 618-619 of a cylindrical housing 614-615. Outer fasteners 1108 may be contained and spring-activated so that outer fasteners 1108 may be loosened and disengaged from a cylindrical housing 614-615 without being removed.

Static seal assembly 706 may further include one or more outer face seals 1110, and one or more inner face seals 1112. Outer face seals 1110 are ring-shaped seals having a diameter corresponding with a diameter of an interior end 618-619 of a cylindrical housing 614-615 (see FIG. 6). Outer face seals 1110 are configured to be compressed or squeezed between an interior end 618-619 of a cylindrical housing 614-615 and exterior face 1105 of end cap 1102 to provide a seal between a cylindrical housing 614-615 and end cap 1102. Inner face seals 1112 are ring-shaped seals having a diameter corresponding with a diameter of an interior end 514-515 of a body member 502-503 (see FIG. 5). Inner face seals 1112 are configured to be compressed or squeezed between an interior end 514-515 of a body member 502-503 and exterior face 1105 of end cap 1102 to provide a seal between a body member 502-503 and end cap 1102.

Static seal assembly 706 may further include a helical spring 1120. Helical spring 1120 is installed between exterior face 1105 of end cap 1102 and an interior end 514-515 of a body member 502-503 (see FIG. 5). Helical spring 1120 is configured to apply a force to push or move end cap 1102 away from an interior end 514-515 of a body member 502-503. Thus, when outer fasteners 1108 are disengaged from rotating structure 104 and inner fasteners 1107 are loosened, helical spring 1120 acts to move end cap 1102 axially away from an interior end 514-515 of a body member 502-503.

Figure 12:
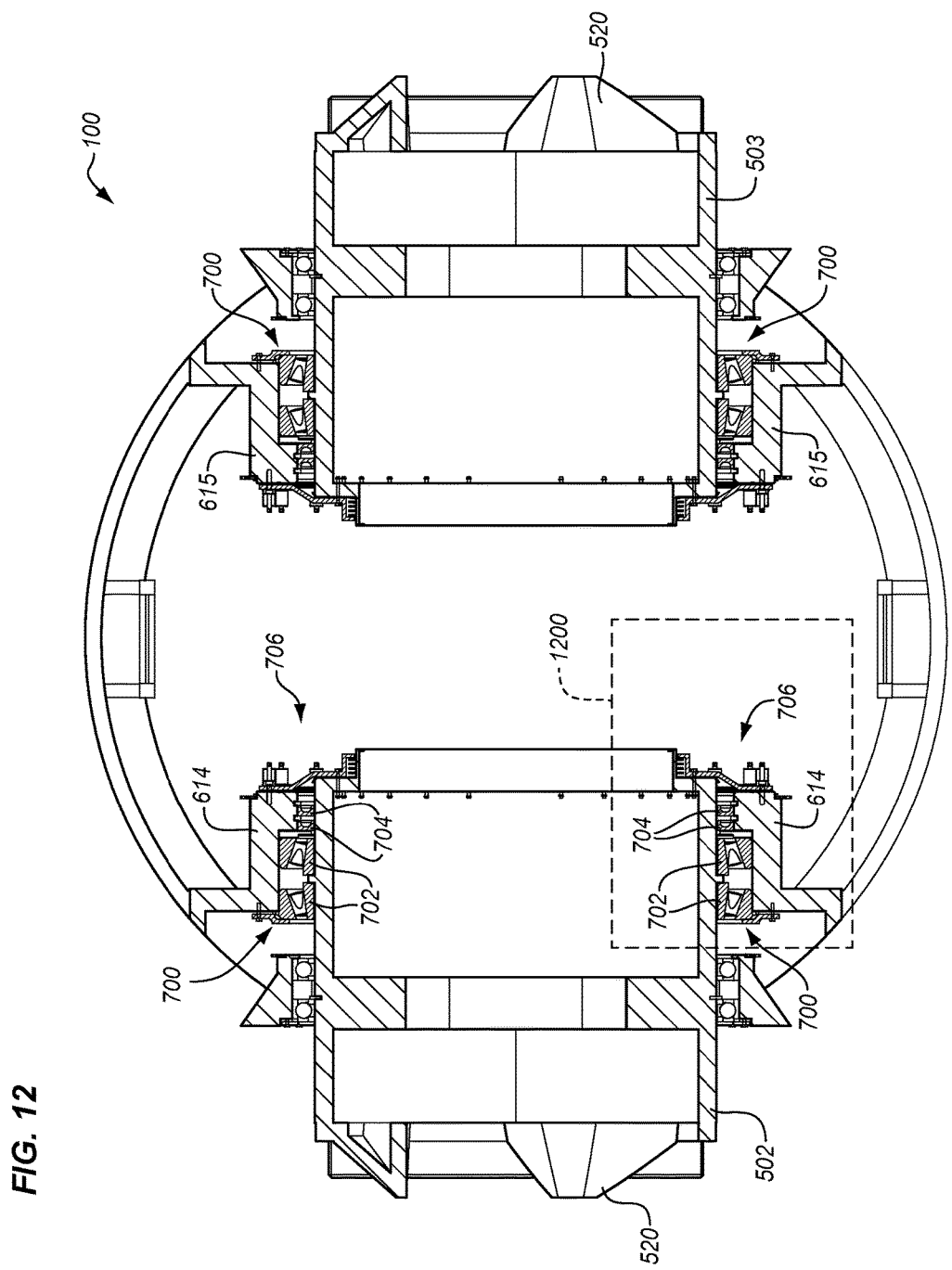
FIG. 12 is a cross-section of a habitation module in an illustrative embodiment.
Figure 13:
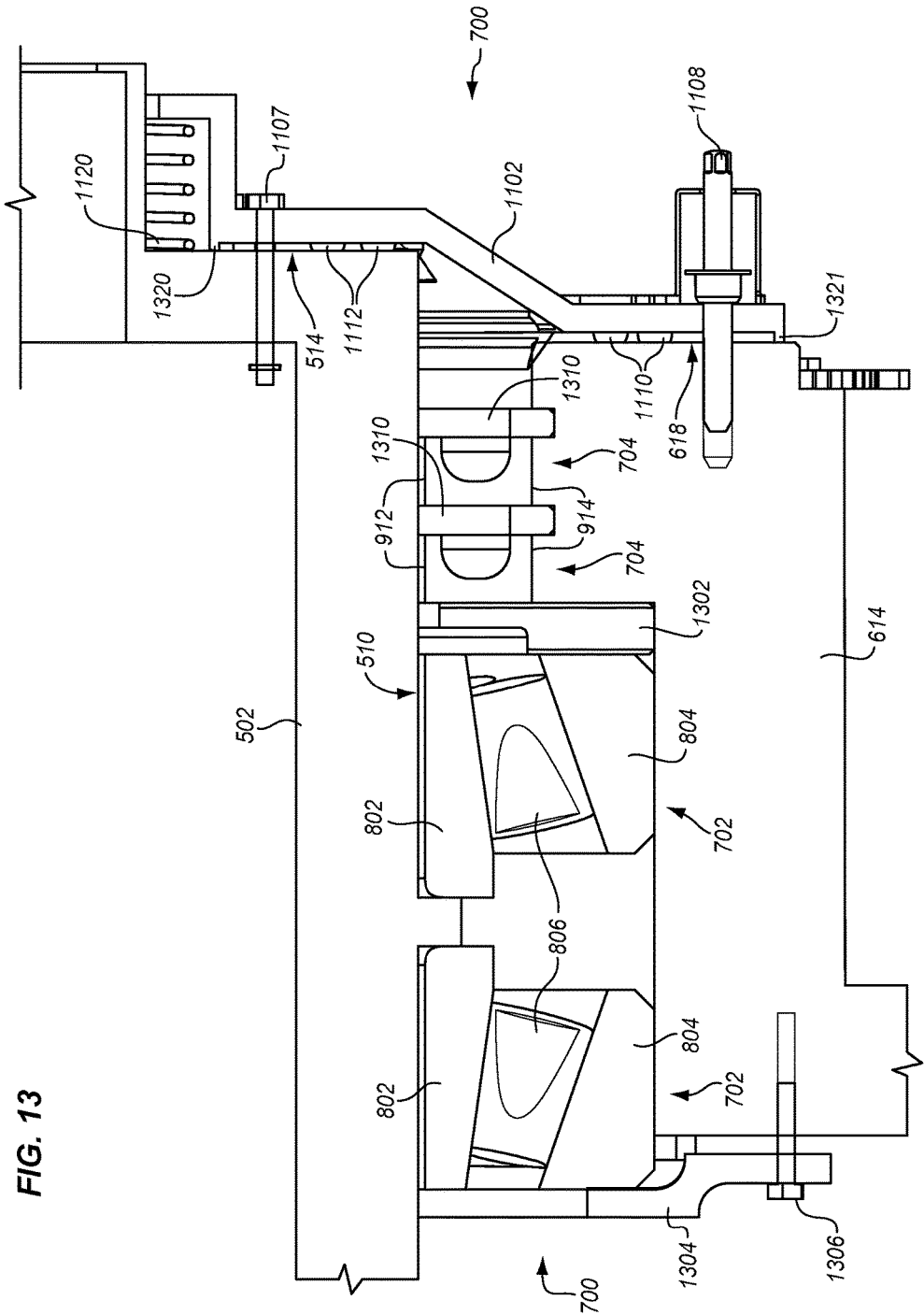
FIG. 13 is a magnified view of an attachment point between a rotating structure and a stationary structure in an illustrative embodiment.
Figure 14:
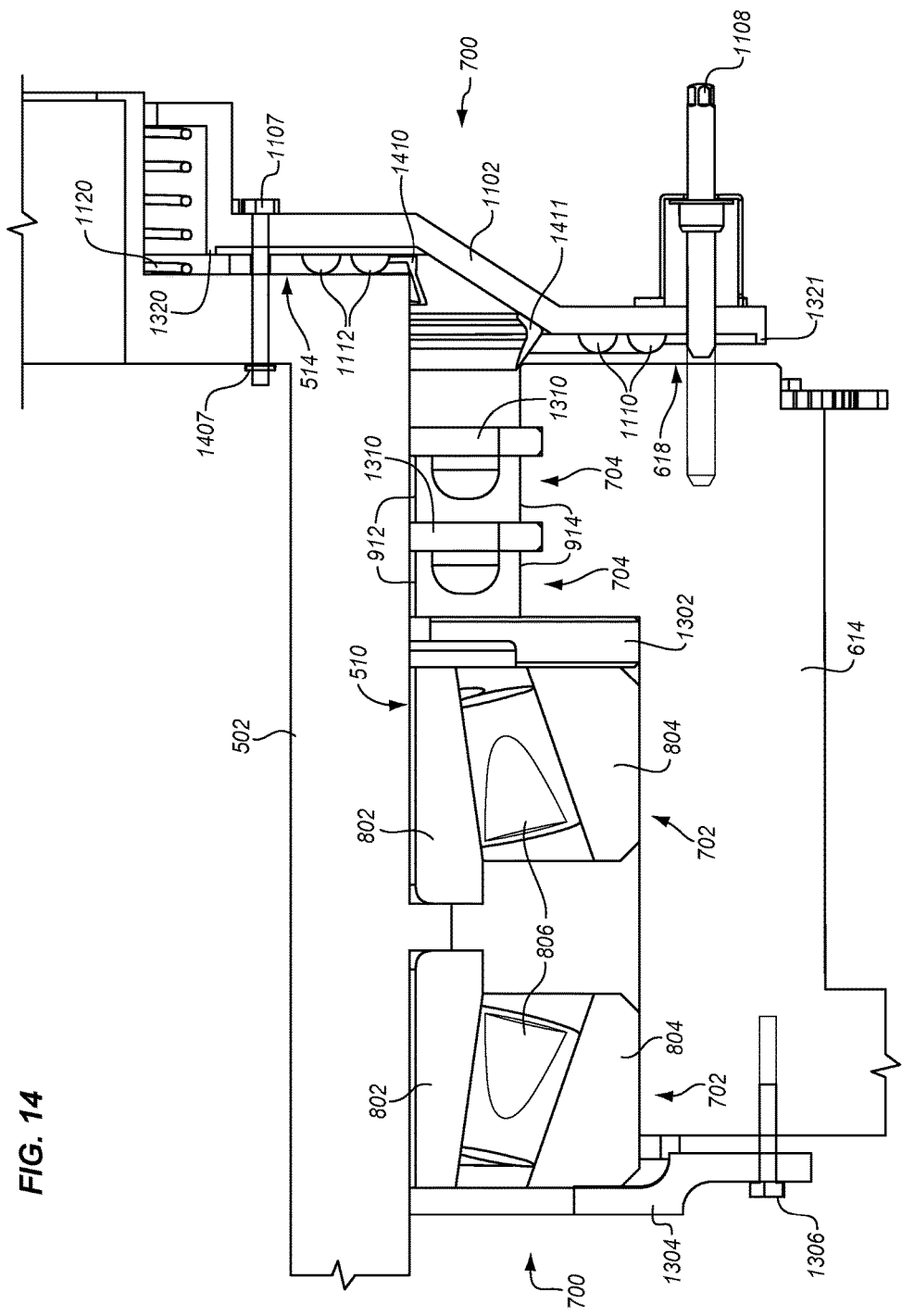
FIG. 14 is another magnified view of an attachment point between a rotating structure and a stationary structure in an illustrative embodiment.

A further description of attachment assemblies 700 are shown in FIGS. 12-14. FIG. 12 is a cross-section of HAB 100 in an illustrative embodiment. The view in FIG. 12 is across view arrows 12-12 in FIG. 4. As is evident in FIG. 12, cylindrical housing 614 of rotating structure 104 rotatably couples to body member 502 of stationary structure 102 via an attachment assembly 700. Likewise, cylindrical housing 615 of rotating structure 104 rotatably couples to body member 503 of stationary structure 102 via an attachment assembly 700. Attachment assemblies 700 each include tapered roller bearings 702, radial seals 704, and static seal assembly 706. As described above, static seal assembly 706 is configured to move between a locked position and an unlocked position. In the unlocked position, static seal assembly 706 is configured to unlock rotating structure 104 from stationary structure 102. Static seal assembly 706 may be set in the unlocked position when HAB 100 is docked on a space station or the like, and radial seals 704 are effectively providing a hermetic seal between rotating structure 104 and stationary structure 102. In the locked position, static seal assembly 706 is configured to lock rotating structure 104 to stationary structure 102 to prevent rotation of rotating structure 104. Static seal assembly 706 also hermetically isolates the radial gap between rotating structure 104 and stationary structure 102 from the interior 402 of HAB 100. Static seal assembly 706 may be set in the locked position if there is a leak or failure in radial seals 704 which can cause depressurization of HAB 100. When static seal assembly 706 is moved into a locked position, static seal assembly 706 seals the radial gap so that pressure may be maintained in HAB 100. Rotating structure 104 will not be allowed to rotate when static seal assembly 706 is locked, but crew members may still be able to access a pressurized environment within HAB 100 even though artificial gravity is not being generated in gravity chambers 110-111.

FIG. 13 is a magnified view of an attachment point 1200 between rotating structure 104 and stationary structure 102 in an illustrative embodiment. Attachment assembly 700 rotatably couples rotating structure 104 to stationary structure 102 via tapered roller bearings 702. In the radial direction (up and down in FIG. 13), tapered roller bearings 702 are installed between body member 502 of stationary structure 102 and cylindrical housing 614 of rotating structure 104. In the axial direction (left and right in FIG. 13), tapered roller bearings 702 are aligned coaxially between a bearing shim 1302 and a bearing cap 1304 of the attachment assembly 700. Bearing cap 1304 may be tightened via fastener 1306 so that the bearing preload of tapered roller bearings 702 is optimized to ensure proper function of radial seals 704. Radial seals 704 are also installed coaxially between body member 502 of stationary structure 102 and cylindrical housing 614 of rotating structure 104. Contact surfaces 912 of radial seals 704 contact the outer cylindrical surface 510 of body member 502, and contact surfaces 914 of radial seals 704 contact a surface of cylindrical housing 614. Thus, radial seals 704 span a radial gap between body member 502 and cylindrical housing 614 to provide a hermetic seal. In the axial direction, radial seals 704 are placed between tapered roller bearings 702 and the interior 402 of HAB 100. Radial seals 704 may be held in place via snap rings 1310.

In this view in FIG. 13, static seal assembly 706 is in a locked position. Thus, inner fasteners 1107 and outer fasteners 1108 are tightened to draw end cap 1102 against interior end 514 of body member 502 and interior end 618 of cylindrical housing 614. When end cap 1102 is affixed in this manner, rotating structure 104 is physically linked to stationary structure 102 to prevent rotation of rotating structure 104. Also, inner face seals 1112 are compressed between end cap 1102 and interior end 514 of body member 502, and outer face seals 1110 are compressed between end cap 1102 and interior end 618 of cylindrical housing 614. This provides a closeout seal by isolating the interior 402 of HAB 100 from the outside environment, which may be exposed via the radial gap between rotating structure 104 and stationary structure 102. Exterior face 1105 of end cap 1102 may include stops 1320-1321 that control the exact compression on inner face seals 1112 and outer face seals 1110. For example, stop 1320 of end cap 1102 contacts interior end 514 of body member 502 and stop 1321 contacts interior end 618 of cylindrical housing 614 when inner fasteners 1107 and outer fasteners 1108 are tightened to control how much inner face seals 1112 and outer face seals 1110 are compressed. Also, in the locked position, helical spring 1120 is compressed between end cap 1102 and interior end 514 of body member 502.

FIG. 14 is another magnified view of the attachment point 1200 between rotating structure 104 and stationary structure 102 in an illustrative embodiment. In this view in FIG. 14, static seal assembly 706 is in an unlocked position. Thus, outer fasteners 1108 are loosened and disengaged from interior end 618 of cylindrical housing 614. Because outer fasteners 1108 are contained, they do not need to be removed and are held in place while disengaged. Inner fasteners 1107 are also loosened a particular amount as determined by placement of stop washer 1407. With outer fasteners 1108 disengaged and when loosening inner fasteners 1107, helical spring 1120 applies a force to move end cap 1102 axially away from interior end 514 of body member 502 and interior end 618 of cylindrical housing 614 (to the right in FIG. 14). With end cap 1102 moved axially, it is becomes disengaged from cylindrical housing 614. Also, inner face seals 1112 are no longer compressed between end cap 1102 and interior end 514 of body member 502, and outer face seals 1110 are no longer compressed between end cap 1102 and interior end 618 of cylindrical housing 614. Rotating structure 104 is therefore free to rotate in relation to stationary structure 102.

Static seal assembly 706 may further include dust seals 1410-1411. A dust seal 1410-1411 is an annular seal having a lip that protrudes from exterior face 1105 of end cap 1102. When end cap 1102 is shifted in the unlocked position, dust seal 1410 extends between end cap 1102 and interior end 514 of body member 502. Dust seal 1411 extends between end cap 1102 and interior end 618 of cylindrical housing 614. Thus, dust seals 1410-1411 protect radial seals 704 from dust or internal debris.

FIG. 15 is a cross-sectional view of HAB 100 in an illustrative embodiment.

This view shows the connection between body member 502 and body member 503 of stationary structure 102 via splined sleeve 506. Body member 502 includes a detachable connector bracket 1502, and body member 503 includes a detachable connector bracket 1503. One end 1512 of connector bracket 1502 is splined, and one end 1513 of connector bracket 1503 is splined so that connector brackets 1502-1503 may couple to one another via splined sleeve 506. When static seal assembly 706 is in the locked position, body members 502-503 may be detached from one another. In other words, connector brackets 1502-1503 may be unfastened or otherwise detached from body members 502-503 and stowed. Before static seal assembly 706 transitions to an unlocked position, connector brackets 1502-1503 may be fastened or otherwise attached to body members 502-503 with splined sleeve 506 coupling connector brackets 1502-1503. The splined connection between body members 502-503 ensures that preloads on tapered roller bearings 702 are unaffected by temperature variations in stationary structure 102.

Attachment assembly 700 as described herein has multiple technical benefits. One technical benefit is that attachment assembly 700 provides a rotatable coupling between rotating structure 104 and stationary structure 102 that is hermetically sealed. Another technical benefit is that static seal assembly 706 provides a closeout seal in case radial seals 704 develop leaks and/or the air leak becomes unacceptable. HAB 100 will still function as a pressurized vessel for crew members for the remaining part of the mission.

Figure 16:
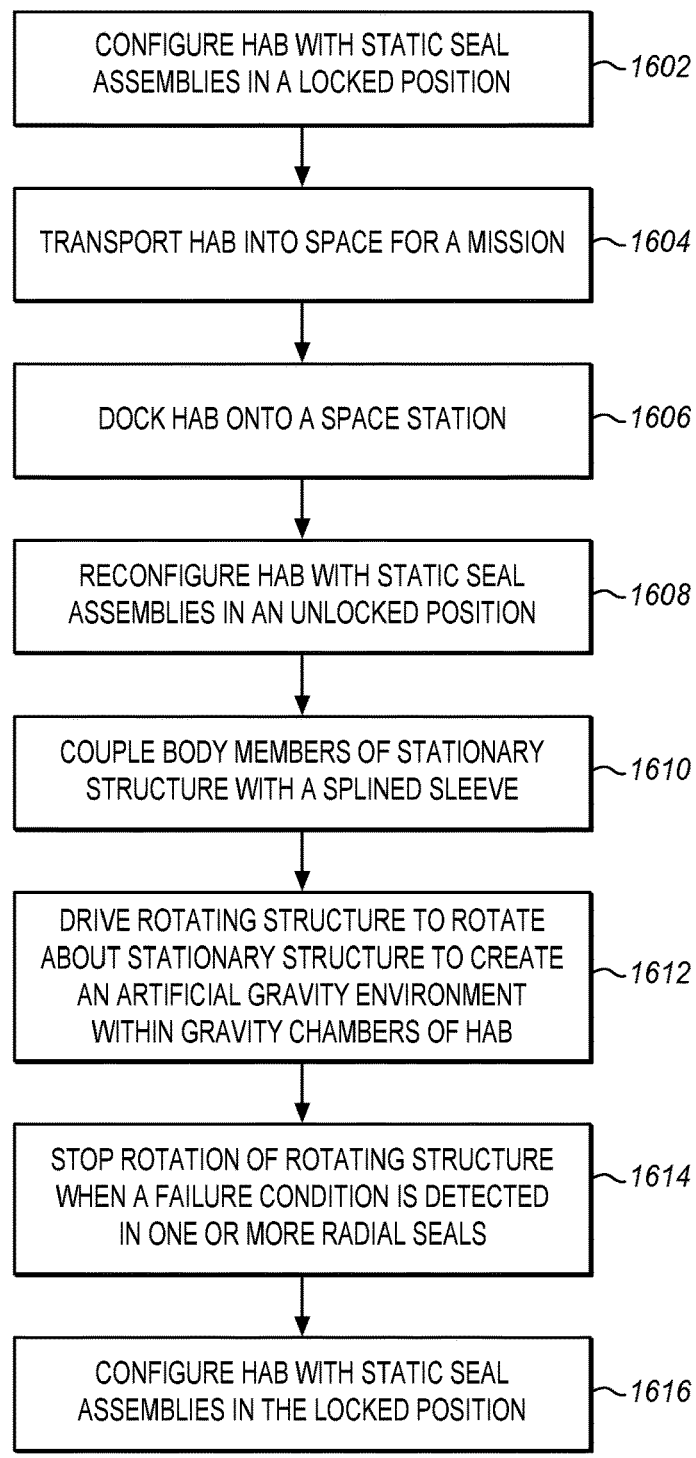
FIG. 16 is a flow chart illustrating a method of using a habitation module in an illustrative embodiment.

FIG. 16 is a flow chart illustrating a method 1600 of using a HAB 100 in an illustrative embodiment. HAB 100 may initially be configured with static seal assemblies 706 in a locked position (step 1602). For instance, when HAB 100 is being prepared for a mission, static seal assemblies 706 may be attached in the locked position to prevent rotation of rotating structure 104. HAB 100 may then be transported into space for a mission (step 1604) by a suitable launch vehicle. After transport, HAB 100 may be docked onto a space station or the like (step 1606). The interior 402 of HAB 100 may be pressurized after docking. At some point after docking, HAB 100 may be reconfigured with static seal assemblies 706 in the unlocked position (step 1608). Body member 502 of stationary structure 102 may also be coupled to body member 503 via splined sleeve 506 (step 1610). For instance, a crew member may attach detachable connector bracket 1502 to body member 502, attach detachable connector bracket 1503 to body member 503, and attach detachable connector bracket 1502 to detachable connector bracket 1503 via splined sleeve 506.

With static seal assemblies 706 in the unlocked position, rotating structure 104 may be driven to rotate about stationary structure 102 to create an artificial gravity environment within gravity chambers 110-111 (step 1612). This may be referred to as the operation of HAB 100 where rotating structure 104 is rotating about stationary structure 102 to create an artificial gravity environment. The effectiveness of radial seals 704 may be monitored while HAB 100 is in operation. When a failure condition is detected in one or more of radial seals 704, rotation of rotating structure 104 is stopped (step 1614), and HAB 100 is again configured with static seal assemblies 706 in the locked position (step 1616). Static seal assemblies 706 therefore provide a close-out seal between rotating structure 104 and stationary structure 102 so that the failure condition in radial seals 704 does not result in loss of pressurization of HAB 100. With static seal assemblies 706 in the locked position, detachable connector bracket 1502, detachable connector bracket 1503, and splined sleeve 506 may be removed and stored. HAB 100 may be used for the remainder of the mission as a pressurized vessel for the crew members even though an artificial gravity environment is no longer being provided.

Although specific embodiments were described herein, the scope is not limited to those specific embodiments. Rather, the scope is defined by the following claims and any equivalents thereof.

What is claimed is:

1. An attachment assembly of a habitation module configured to attach a rotating structure to a stationary structure, wherein the stationary structure has a cylindrical body member, and the rotating structure has a cylindrical housing that slides over the cylindrical body member, the attachment assembly comprising:
   bearings installed coaxially between the cylindrical housing and the cylindrical body member;
   dynamic radial seals installed coaxially between the cylindrical housing and the cylindrical body member; and
   a static seal assembly having an end cap attached to an interior end of the cylindrical body member that faces toward an interior of the habitation module;
   the end cap is configured to physically link the rotating structure to the stationary structure to prevent rotation of the rotating structure, and to seal around the interior end of the cylindrical body member and around an interior end of the cylindrical housing to prevent escape of air from the interior of the habitation module.

2. The attachment assembly of claim 1 wherein:
   the end cap is configured to move axially away from the interior end of the cylindrical body member and the interior end of the cylindrical housing, and disengage from the cylindrical housing to allow for rotation of the rotating structure.

3. The attachment assembly of claim 2 wherein:
   the static seal assembly further includes:
   a first annular face seal;
   a second annular face seal having a larger diameter than the first annular face seal; and
   fasteners configured to affix the end cap to the cylindrical body member and the cylindrical housing, to compress the first annular face seal between the end cap and the interior end of the cylindrical body member, and to compress the second annular face seal between the end cap and the interior end of the cylindrical housing.

4. The attachment assembly of claim 3 wherein the fasteners comprise:
   inner fasteners configured to fasten the end cap to the cylindrical body member; and
   outer fasteners configured to fasten the end cap to the cylindrical housing.

5. The attachment assembly of claim 4 wherein:
   the inner fasteners include stop washers that limit an amount that the inner fasteners are loosened.

6. The attachment assembly of claim 3 wherein the static seal assembly further includes:
   a first annular dust seal that extends between the end cap and the interior end of the cylindrical body member when the end cap is moved axially; and
   a second annular dust seal that extends between the end cap and the interior end of the cylindrical housing when the end cap is moved axially.

7. The attachment assembly of claim 3 wherein the static seal assembly further includes:
   a helical spring between the end cap and the interior end of the cylindrical body member that is configured to apply a force to move the end cap axially away from the cylindrical body member.

8. A habitation module comprising:
   a rotating structure configured to rotate about an axis in relation to a stationary structure to create artificial gravity within at least one gravity chamber of the rotating structure; and
   attachment assemblies configured to rotatably couple the rotating structure to the stationary structure;
   wherein the attachment assemblies each comprise:
   bearings installed coaxially between a cylindrical housing of the rotating structure and a cylindrical body member of the stationary structure;
   dynamic radial seals installed coaxially between the cylindrical housing and the cylindrical body member; and
   a static seal assembly that includes an end cap movable between a locked position and an unlocked position;
   wherein in the locked position, the end cap is configured to contact an interior end of the cylindrical body member that faces toward an interior of the habitation module and an interior end of the cylindrical housing to prevent escape of air from the interior of the habitation module;

wherein in the unlocked position, the end cap is configured to disengage from the interior end of the cylindrical housing.

9. The habitation module of claim 8 wherein:
in the locked position, the end cap is configured to fasten to the cylindrical body member and the cylindrical housing to prevent rotation of the rotating structure.

10. The habitation module of claim 8 wherein:
the static seal assembly further includes:
a first annular face seal;
a second annular face seal having a larger diameter than the first annular face seal;
inner fasteners configured to fasten the end cap to the cylindrical body member; and
outer fasteners configured to fasten the end cap to the cylindrical housing.

11. The habitation module of claim 10 wherein:
in the locked position:
the inner fasteners are configured to fasten the end cap to the cylindrical body member with the first annular face seal compressed between the end cap and the interior end of the cylindrical body member; and
the outer fasteners are configured to fasten the end cap to the cylindrical housing with the second annular face seal compressed between the end cap and the interior end of the cylindrical housing.

12. The habitation module of claim 11 wherein:
in the unlocked position:
the outer fasteners are configured to disengage from the cylindrical housing; and
the inner fasteners are configured to loosen to move the end cap axially away from the interior end of the cylindrical body member and the interior end of the cylindrical housing.

13. The habitation module of claim 12 wherein:
the inner fasteners include stop washers that limit an amount that the inner fasteners are loosened.

14. The habitation module of claim 12 wherein:
the static seal assembly further includes:
a first annular dust seal that extends between the end cap and the interior end of the cylindrical body member when the end cap is moved axially; and
a second annular dust seal that extends between the end cap and the interior end of the cylindrical housing when the end cap is moved axially.

15. The habitation module of claim 12 wherein:
the static seal assembly further includes:
a helical spring installed between the end cap and the interior end of the cylindrical body member, and configured to apply a force to move the end cap axially.

16. The habitation module of claim 8 wherein:
the bearings comprise tapered roller bearings; and
the attachment assemblies each further comprise a bearing shim and a bearing cap that sandwich the tapered roller bearings.

17. The habitation module of claim 8 wherein:
the stationary structure includes:
cylindrical body members that are coaxial; and
a splined sleeve that connects the cylindrical body members.

18. A habitation module comprising:
a stationary structure including cylindrical body members that are spaced apart and aligned coaxially;
a rotating structure including cylindrical housings that are aligned coaxially, wherein the cylindrical body members of the stationary structure fit within openings of the cylindrical housings; and
an attachment assembly configured to attach a cylindrical body member of the stationary structure to a cylindrical housing of the rotating structure;
wherein the attachment assembly includes:
tapered roller bearings installed coaxially between the cylindrical body member and the cylindrical housing;
dynamic radial seals installed coaxially between the cylindrical housing and the cylindrical body member to span a radial gap between the cylindrical body member and the cylindrical housing; and
a static seal assembly comprising:
an end cap;
first annular face seals;
second annular face seals having a larger diameter than the first annular face seals;
inner fasteners configured to fasten the end cap to the cylindrical body member with the first annular face seals compressed between the end cap and an interior end of the cylindrical body member that faces toward an interior of the habitation module; and
outer fasteners configured to fasten the end cap to the cylindrical housing with the second annular face seals compressed between the end cap and an interior end of the cylindrical housing.

19. The habitation module of claim 18 wherein the static seal assembly further comprises:
a helical spring installed between the end cap and the interior end of the cylindrical body member, and configured to apply a force to move the end cap axially away from the interior end of the cylindrical body member and the interior end of the cylindrical housing when the inner fasteners are loosened and the outer fasteners are disengaged from the cylindrical housing.

20. The habitation module of claim 19 wherein the static seal assembly further comprises:
a first annular dust seal that extends between the end cap and the interior end of the cylindrical body member when the end cap is moved axially; and
a second annular dust seal that extends between the end cap and the interior end of the cylindrical housing when the end cap is moved axially.

* * * * *